Nov. 1, 1955  D. S. RIDLER ET AL  2,722,565

TELEGRAPH TRANSMISSION SYSTEMS

Filed Jan. 12, 1953

Inventor
D. S. RIDLER — J. D. REYNOLDS
By Philip M. Bolton
Attorney

United States Patent Office 2,722,565
Patented Nov. 1, 1955

2,722,565

TELEGRAPH TRANSMISSION SYSTEMS

Desmond Sydney Ridler and John David Reynolds, London, England, assignors to International Standard Electric Corporation, New York, N. Y.

Application January 12, 1953, Serial No. 330,721

Claims priority, application Great Britain January 11, 1952

5 Claims. (Cl. 178—70)

This invention relates to telegraph transmission systems and more particularly to telegraph relays.

In telegraph transmission systems, it has hitherto been customary to employ electro-magnetic contact-making relays. A relay of this type is costly and requires regular adjustment and general maintenance by skilled personnel. Furthermore, it is apt to introduce distortion of the signal in the form of bias distortion or contact bounce.

The present invention provides a double-current non-contact-moving relay in which control of the mark and space currents is accomplished with the aid of saturable reactors. A saturable reactor may be conveniently defined as an inductive control device through which the flow of an output alternating current may be controlled by an input direct current. The direct current is applied to a "control" winding while the alternating current flows through a corresponding "power" winding.

Figure 1:
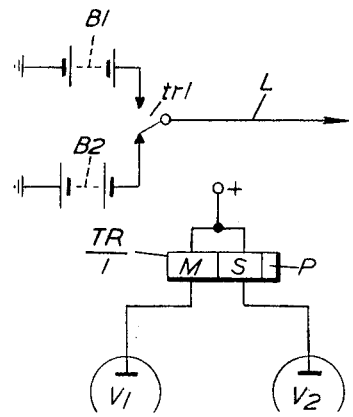
Figure 2:
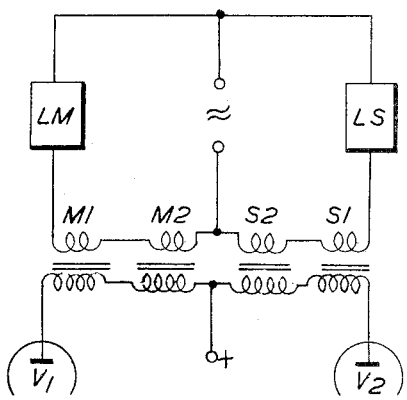
Figure 3:
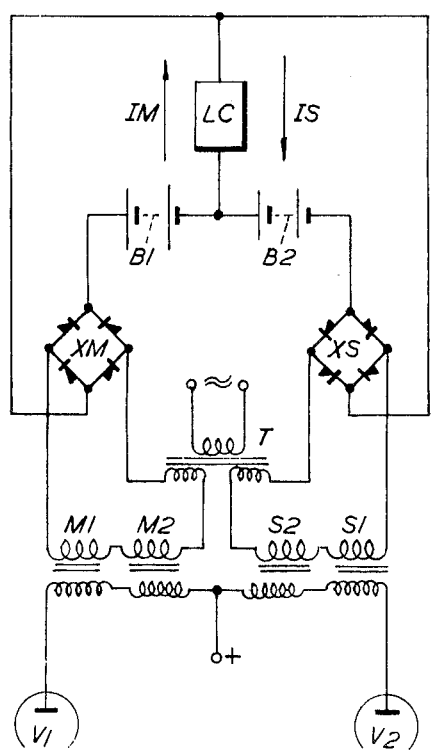
Figure 4:
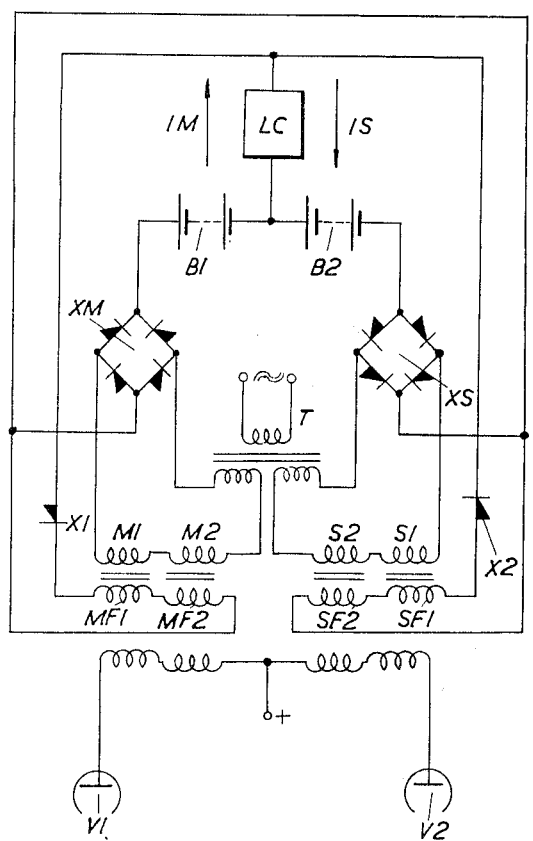

The invention and its relationship to the prior art will now be described with reference to the accompanying drawings, of which:

Fig. 1 shows schematically a telegraph relay of the electro-magnetic contact-making type, Fig. 2 shows a first embodiment of the invention from which the output is in the form of alternating current telegraph signals, Fig. 3 shows a modified embodiment of the invention from which the output is in the form of direct current telegraph signals, while Fig. 4 shows a further modified embodiment of the invention from which the output is in the form of direct current telegraph signals and which is "side-stable" i. e. remains in the condition into which it was last set.

Referring to Fig. 1, the relay TR comprises two windings M and S together with a polarising winding P which acts to hold the relay in the condition into which it was last set even if the windings M and S are both de-energised.

For the sake of example and in order to secure uniformity with the other figures of the drawings, the mark and spacing windings M and S have been shown as receiving their operating currents from two electric discharge tubes V1 and V2. The latter are assumed to be connected as a flip-flop pair wherein the conduction of either tube effects the extinction of the other. The windings of the relay control a changeover contact tr1 for applying either positive potential (from battery B1) or negative potential (from battery B2) to the telegraph line L.

As already mentioned the type of relay just described suffers from a number of disadvantages which are substantially overcome by the present invention now to be described with reference to Figs. 2 to 4 of the accompanying drawings.

Referring to Fig. 2, M1, M2 and S1, S2 are two pairs of saturable reactors each having a control (D. C.) winding and an A. C. winding. The control windings of the mark reactors M1 and M2 are connected in mutual opposition in the anode circuit of tube V1 and those of the space reactors S2 and S1 are connected in mutual opposition in the anode circuit of tube V2. The A. C. windings of all four reactors are supplied from a source of alternating potential, those of M1 and M2 through a load impedance LM and those of S2 and S1 through a similar load impedance LS. By employing a pair of reactors in each limb of the circuit and connected as shown (instead of using a single reactor) the alternating currents induced into the control windings cancel each other out.

When the mark tube V1 is conducting its anode current flowing through the control windings of reactors M1 and M2 is sufficient to saturate the cores of these reactors and this, as is well known in the art, greatly reduces the impedance of their A. C. windings. Thus a comparatively large alternating current is supplied to the load LM. On the other hand the reactors S1 and S2 present a relatively high impedance in the absence of a controlling direct current so that little if any alternating current flows through the load LS.

If tube V2 is made conducting and tube V1 extinguished the reverse conditions obtain and alternating current is supplied to load LS.

In the modified circuit shown in Fig. 3, the loads LM and LS are replaced by rectifier bridges XM and XS. By this means a direct current output is supplied to the common load LC. If the two bridges were connected to the load LC directly then the output from either bridge would be short-circuited by the other.

In order to prevent this, two batteries B1 and B2 are introduced into the circuit as shown, their voltages being equal to each other and just under half the rectified voltage output from either one of the bridges XM or XS. Thus if batteries B1 and B2 are the normal 80–0–80 volt signal batteries conventionally used in this type of circuit, the rectified voltage output from either bridge would be just over 160 volts.

Let it first be assumed that direct current is flowing through the control windings of the mark reactors M1 and M2. Alternating current is supplied via transformer T and the A. C. windings of M1 and M2 to bridge XM which produces (just over) 160 volts. Owing to the relative polarities of bridge XM and battery B1, their respective voltages oppose one another to yield a resultant of 80 volts across the load LC. Since the positive terminal of rectifier bridge XM is connected (via battery B1) to the lower end (in the figure) of load LC and since the bridge voltage is the higher of the two opposing voltages the direction of current flow in the load will be in the direction of the arrow IM. No current flows through bridge XS since it is completely blocked by battery B2.

If the conditions are reversed the output of bridge XS overcomes the output of battery B2 and 80 volts appears across the load LC with opposite polarity causing current to flow in the direction of the arrow IS. At the same time any path through bridge XM is effectively blocked by battery B1.

If the voltage across the load tends to increase above 80 volts then (assuming the circuit to be in the mark condition) the battery B2 is overcome and the rectifier XS is unblocked. Thus the voltage across the load remains constant as does the current through the load. However, some "overflow" current will flow through the parallel circuit consisting of battery B2 and rectifier XS. The presence of this overflow current is necessary to ensure that a constant current flows through the load.

The resistance of the load may change (due, for example, to the introduction of an additional telegraph instrument) and the line may have large capacities to earth which must be charged at each change-over of the relay. If the overflow current is to persist when the load resistance is changed or while the line capacities are being charged, the current supplied by the reactors must be greatly in excess of that normally drawn by the load. While the excess current is not entirely wasted, in that it charges up the batteries, it means that much more A. C. power must be generated than is normally used by the load.

In the embodiment now to be described the excess current is kept to a minimum and in addition the relay is rendered "side-stable" i. e. its operation becomes analogous to that of the polarised relay shown in Fig. 1.

Referring now to Fig. 4, it will be seen that each of the saturable reactors M1, M2 and S1, S2 is provided with a feedback winding MF1, MF2, SF1 and SF2 respectively. These are wound in the same sense as their coresponding control windings and are provided with slightly more turns than their corresponding power windings. Feedback windings MF1 and MF2 are connected in series with a rectifier X1 and the load LC. Similarly feedback windings SF1 and SF2 are connected in series with a rectifier X2 and the load LC. It will be apparent that in the mark condition the load current will flow through feedback windings MF1 and MF2 while during the space condition the load current will flow through feedback windings SF1 and SF2.

In describing the operation of this embodiment it will first be assumed that the mark valve V1 begins to pass current through the control windings of the mark reactors M1 and M2. This allows alternating current to be rectified by rectifier bridge XM so that direct current flows through the load LC in the direction of the arrow IM. This current also flows through the feedback windings MF1 and MF2 so effectively increasing the control current. This in turn produces more load current and the process is cumulative until the normal load current is flowing through LC. The overflow current then flows through the parallel circuit consisting of battery B2 and the space rectifying bridge XS. Since this current does not flow through the feedback windings MF1 and MF2 the cumulative action ceases.

If the current in the control windings of the mark reactors is now cut off, the load current flowing through the feedback windings MF1 and MF2 acts in lieu of the control current and maintains the alternating-current windings in the low impedance condition. Thus the circuit may be said to be side-stable for, of course, an analogous condition arises when the circuit is in the space condition.

When it is desired to switch the circuit over to the space condition valve V2 conducts while valve V1 is cut off, thus passing a control current through the control windings of the space reactors. This initiates a cumulative building-up of load current in the direction of the arrow IS. This current opposes the previously flowing load current in the other direction so that the current through the mark feedback windings is reduced. This initiates a cumulative reduction in the current IM which rapidly dies to nothing. By means of this cumulative building-up and reduction of current, it will be appreciated that the switching-over action is greatly accelerated as compared with the previous embodiments.

While the principles of the invention have been described above in connection with specific embodiments, and particular modifications thereof, it is to be clearly understood that this description is made only by way of example and not as a limitation on the scope of the invention.

What we claim is:

1. A static telegraph relay for controlling the application of signals to a load circuit, comprising a saturable core reactor having a control winding and a signal winding, the control winding consisting of two equally wound serially connected parts, each part being wound in opposition to the other, a signal generator coupled to said load circuit and said signal winding, the normal impedance of said signal winding effectively blocking said generator, means applying a direct current to said control winding thereby saturating the core and reducing the impedance of said signal winding, whereby said signal generator is unblocked and signals are applied to said load circuit, and the two parts of said control winding cancelling out induced signal currents produced by the operation of said signal generator.

2. The relay according to claim 1, and further comprising an electron vacuum tube having its anode coupled to one end of said control winding, a source of direct-current potential coupled to another end of said control winding, whereby during the conduction of said tube a direct-current flows in said control winding, saturating the core thereof.

3. The relay according to claim 1, wherein said signal generator generates mark and space signals, a load circuit for said mark signals and a load circuit for said space signals, a saturable core reactor coupled to each of said load circuits, whereby when it is desired to apply a mark signal to the mark load circuit a direct-current is applied to the control winding of the saturable core reactor coupled to the mark load circuit.

4. The relay according to claim 1, wherein said signal generator generates mark and space signals, a first saturable core reactor to control the application of mark signals to said load circuit and a second saturable core reactor to control the application of space signals to said load circuit, a pair of rectifier bridge circuits coupled respectively between said first reactor and load circuit and said second reactor and load circuit, whereby the signals are rectified before application to said load circuit, and means biasing said rectifier circuits to render one of said circuits inoperative during the operation of the other.

5. The relay according to claim 4, wherein each of said saturable core reactors comprises a feedback winding coupled to said load and wound in the same sense as its corresponding control winding, the feedback winding being connected to maintain the flow of signal current in its corresponding signal winding, whereby upon de-energization of the control winding the signal current in said signal winding is maintained.

References Cited in the file of this patent

UNITED STATES PATENTS 2,039,629   Burton _____ May 5, 1936